May 8, 1934.  D. C. WRIGHT  1,958,404
SAFETY MOTOR CONTROLLING SYSTEM
Filed Dec. 31, 1930  2 Sheets-Sheet 1
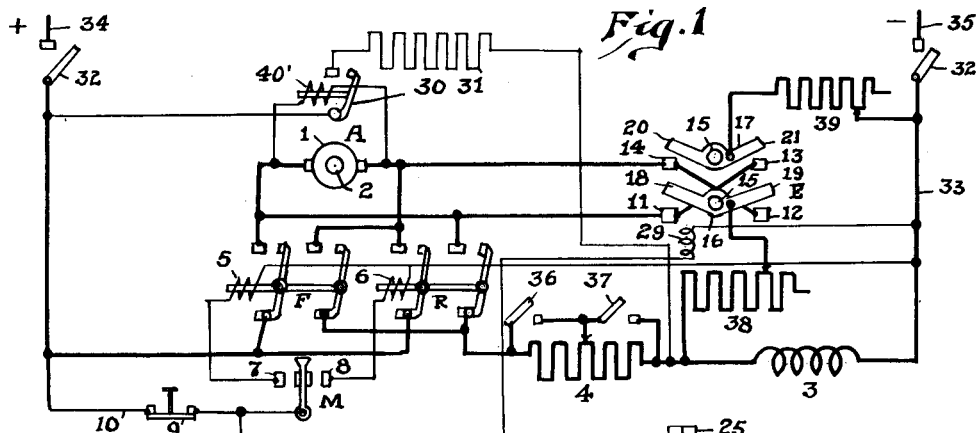
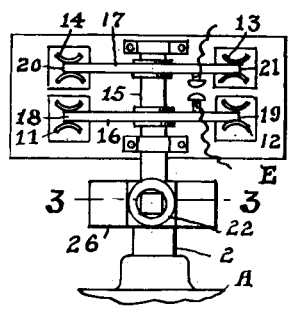
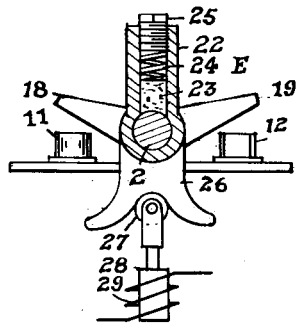
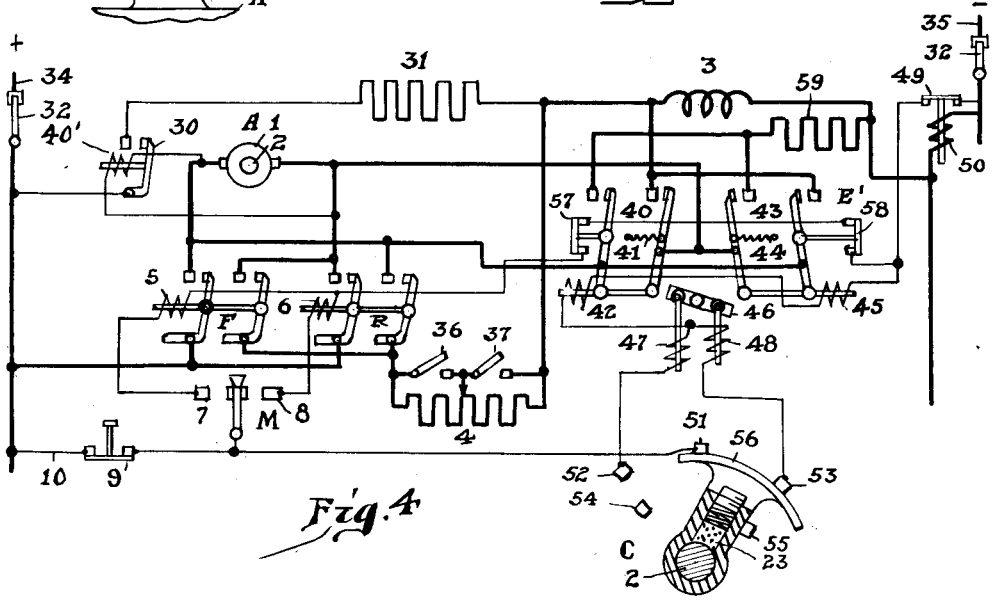
INVENTOR
D. C. Wright
by F. N. Barber
attorney May 8, 1934.   D. C. WRIGHT   1,958,404
SAFETY MOTOR CONTROLLING SYSTEM
Filed Dec. 31, 1930   2 Sheets-Sheet 2
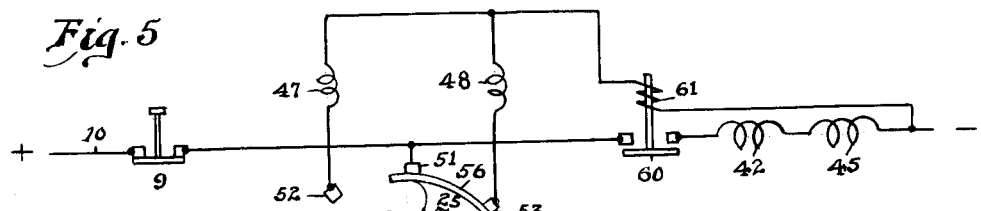
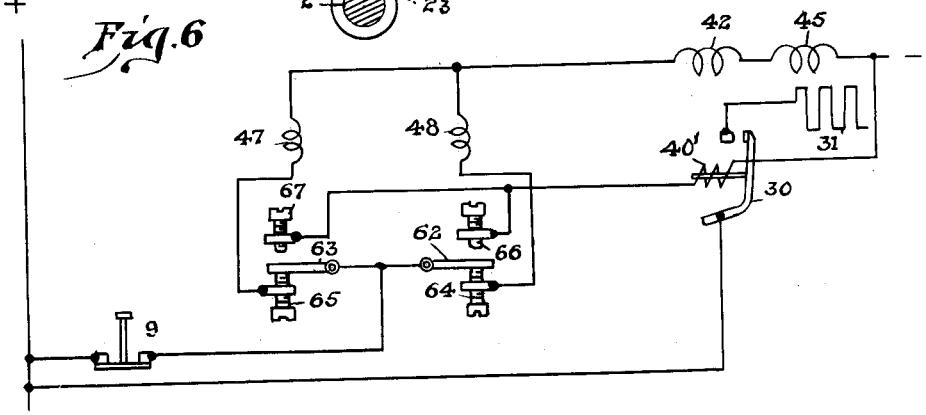
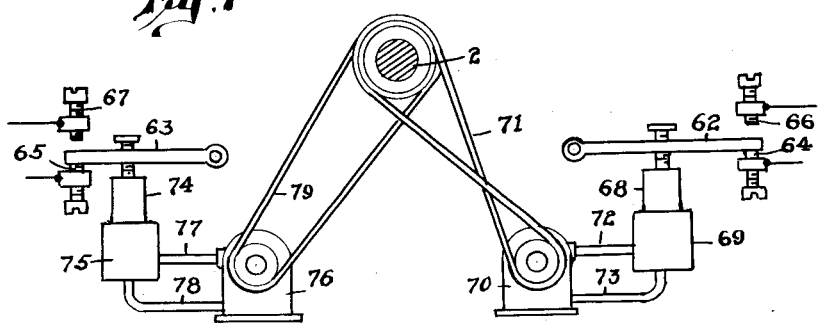
INVENTOR
D. C. Wright
by F. N. Barber
Attorney Patented May 8, 1934

1,958,404

UNITED STATES PATENT OFFICE 1,958,404

SAFETY MOTOR CONTROLLING SYSTEM

David C. Wright, Euclid, Ohio, assignor to The Electric Controller & Manufacturing Company, Cleveland, Ohio, a corporation of Ohio Application December 31, 1930, Serial No. 505,688

28 Claims. (Cl. 172—179)

This invention relates to control systems for reversing electric motor driven machines, and is applicable to the control of bridge and trolley motions of electric overhead traveling cranes.

The principal object of the invention is to safeguard the overtravel of the machine in the event of failure of power on the supply lines; also to provide a quick stop in case of emergency.

On the bridge and trolley motions of electric cranes, it is general practise to use series wound motors, the stopping of which is effected by reverse power applied to the motor. When working near the end of the limit of travel or near another crane mounted on the same runway, the operator relies upon reverse power to stop under ordinary working conditions. If power fails at the moment of applying reverse power to stop immediately after the motor has been operating under forward power or while the machine has been drifting without power, no stopping effect can be produced by power from the source. In such cases the stopping must be effected by other safety devices, such as spring or gravity set magnetically-operated brakes or by hand or foot-operated brakes. Magnetic brakes are objectionable from the standpoint of cost and other well known reasons.

It is difficult to install the mechanism for operating foot-operated brakes on the trolley motion if the operator's cab is mounted on the bridge girders, and it is equally difficult to install the mechanism for operating foot-operated brakes on the bridge motion when the operator rides on the trolley. Moreover, a failure of power is an unexpected event and the operator must think and act quickly to prevent an accident by the application of a foot-operated brake after he discovers that reverse power is of no avail in stopping. Furthermore, the operator may become confused and not do the right thing if emergency stopping depends upon any action on his part.

The possibility of accidents has been increased with cranes of modern design owing to the use of antifriction bearings on the bridge and trolley motions. Since series motors are used the decreased running friction when the machine is up to speed results in the motors attaining higher speeds than those experienced when the former sleeve bearings were used. Definite stopping means must therefore be provided to prevent the over-travel of the bridge or trolley when power fails. In a large proportion of the uses of motors where dynamic braking is desired, series motors having a single or one series field winding are selected. These are widely known and of standard character and it is one of the objects of this invention therefore, to so arrange my safety motor control system that no changes shall be required in the motor to make necessary connections for effecting of dynamic braking of such motors or other standard types of motors.

It is an object of this invention to effect at any time the stopping of the motor automatically when power fails, regardless of the position of the operator's controller and regardless of what the operator may do under the circumstances. The stopping is effected by connecting the armature and series field of the motor in a dynamic braking circuit such that the direction of current supplied by the armature due to its counter E. M. F., will flow through the series field in the same direction as when power was previously applied, and this connection is determined only by the direction of rotation of the motor armature at the moment of power failure.

A more specific object of my invention is the provision of a very simple emergency switch for making dynamic braking connections upon failure of the line power, and which shall be physically responsive to the direction of rotation of the motor to invariably cause the proper circuit connections to be made for dynamic braking.

Still other objects include the arrangement with standard forms of single series field motors of a dynamic braking means so that it may be most economically installed without changes upon the standard field and armature windings, and which will avoid any likelihood of damage to the motor, due to too abrupt dynamic braking, which may result from the use of reversing mechanism without proper inclusion of resistance.

Referring now to the accompanying drawings, Fig. 1 is a schematic diagram of the motor connections illustrating one form of my invention; Fig. 2, a plan view of the emergency switch for making dynamic braking connections when the power fails; Fig. 3, a view on the line 3—3 on Fig. 2; Fig. 4 is a schematic diagram of another form which my invention may take; Fig. 5, a modification of the circuits shown in Fig. 4; Fig. 6, a modification of the safety switch shown in Fig. 5; and Fig. 7, an elevation of the operating mechanism for the switch shown in Fig. 6.

Referring first to Figs. 1, 2, and 3, A is an electric motor having the armature 1 which drives the shaft 2. 3 is the series field for the motor and 4 is the accelerating resistance for the motor. F and R are two pairs of switches operated by current through the windings 5 and 6 respectively. M is a master controller arranged to engage either of the fixed contacts 7 and 8 leading respectively to the windings 5 and 6. 9 is a push-button stopping switch in the wire 10 leading from the supply line to the master controller. The safety switch E has the fixed contacts 11, 12, 13, and 14. A shaft 15 has attached thereto and insulated therefrom the two switch arms 16 and 17. Contacts 18 and 19 on the arm 16 are engageable with the contacts 11 and 12 and the contacts 20 and 21 on the arm 17 are engageable with the contacts 14 and 13 in a manner hereinafter described. One end of the shaft 15 receives the end of the shaft 2. The shaft 15 has the upwardly extending projection 22 which contains the carbon brush 23 bearing upon the shaft 2, the brush being urged toward the shaft by the spring 24 which is adjustable by means of the screw plug 25. The lower side of the shaft 15 carries the notched or forked cam 26 to receive the roller 27 carried by the upper end of the armature 28 which is magnetically held in the position shown by current in the winding 29. This winding is connected across the wires supplying current to the motor. As long as the roller 27 is held in the notch of the cam the switch E is held with its arms 16 and 17 out of engagement with its fixed contacts.

If the shaft 2 is rotating counter clockwise it will through friction with the brush 23 tend to cause the contacts 18 and 20 to engage the stationary contacts 11 and 14, but the cam 26 as well as the switch E will be prevented from moving as long as the winding 29 is energized. If the winding 29 is de-energized while the shaft 2 continues to rotate the movable contacts 18 and 20 will immediately engage the contacts 11 and 14. If the rotation of the shaft 2 is clockwise, then upon failure of power in the winding 29 the movable contacts 19 and 21 will be caused to engage the fixed contacts 12 and 13.

In order to keep the field 3 partially energized while the machine is drifting after power has been cut off from the motor, a teaser field circuit is supplied through the contactor 30 and the high resistance 31. The operating winding of the contactor 30 is connected across the terminals of the armature 1. By reason of the counter E. M. F. of the motor the contactor 30 closes as soon as the motor starts to turn in either direction and causes a small amount of current to be introduced into the series field winding 3 while the motor is running. This contactor 30 will remain closed due to the counter E. M. F. of the armature while the machine is drifting with power cut off from the motor. A circuit through the contactor 30 and the resistance 31 keeps the series field 3 partially energized so that in the event of power failure during a drifting operation the field will build up immediately and cause the dynamic braking current to flow in the circuits to be described hereinafter. In those motors in which residual magnetism of the field is sufficient to initiate the dynamic braking current, the described teaser field circuit with its contactor 30 and resistance 31 can be omitted.

The operation of the mechanism shown in Figs. 1, 2, and 3 is as follows: When the line switches 32 have been closed the winding 29 is energized and the roller 27 is pushed up to engage in the fork of the cam 26 to hold the switch with its movable contacts out of engagement with its fixed contacts. The operator can then run the motor in one direction, counter clockwise, by moving the master controller M to the left so that current flows through the wire 10, the switch 9 and the master controller contact 7 and the operating winding 5 of the switch F to the wire 33. Motor current then flows from the positive supply line 34, through one member of the contactor F, the motor armature 1, the other member of the contactor F, the acceleration resistance 4 and the series field 3 to the negative supply line 35. The accelerating resistance 4 may be controlled in any well known manner, the switches 36 and 37 showing conventionally means for cutting out the resistance in two steps. If power fails while the master switches are on the contactor 7 the contact F will open due to failure of power in its operating winding 5. Also the winding 29 will be de-energized which will permit the shaft 2 of the motor to turn the shaft 15 of the switch E in a counter clockwise direction whereby the contacts 18 and 20 will engage the respective contacts 11 and 14. Dynamic braking current now flows from the left terminal of the armature 1 through contacts 11 and 18, the dynamic braking resistance 38, the series field 3, the dynamic braking resistance 39 and the contacts 20 and 14 to the right hand terminal of the armature 1. The motor is immediately slowed down and stopped by this dynamic braking circuit, the quickness of the stop being determined by the amount of dynamic braking current allowed to flow as permitted by the resistances 38 and 39 which are shown to be adjustable. This adjustment may be accomplished in any well known manner. When power is restored the winding 29 is again energized and the apparatus is ready to operate again.

If the operator wishes to rotate the armature in the reverse direction he moves the master controller to the right so that it engages the contact 8, thereby causing current to flow through the operating winding 6 of the reversing switch R. Motor current now flows from the supply line 34 through one member of the switch R, the armature 1, the other member of the switch R, the resistance 4 and the series field 3 to the other supply line 35. This circuit causes the motor to rotate in the opposite direction from what it operated when the master controller engaged the contact 7. The contactor 30 closes as soon as the armature begins to move, supplying as before an additional amount of current to the series field 3. If power fails while the motor is operating in the reverse direction, the switch R opens due to failure of power in its operating coil 6. At the same time the winding 29 is de-energized which permits its armature to drop and move the roller 27 out of locking relation with the cam 26 which is carried by the shaft 15. The shaft 2 which is now rotating clockwise moves the switch E so that contacts 19 and 21 engage the fixed contacts 12 and 13. The dynamic braking circuit is now from the right hand side of the armature 1 through the contacts 12 and 19 of the switch E, the resistance 38, the series field 3, the resistance 39 and the contacts 21 and 13 of the switch E to the left hand terminal of the motor armature. This dynamic braking circuit slows down and stops the motor as previously described.

If the operator should move his master controller M to its central or off position while the machine driven by the motor is operating in either direction, one or the other of the switches or contactors F and R will open and the machine will drift due to its momentum, the contactor 30 being kept closed because of the counter E. M. F. of the motor armature which is still applied to the winding 40'. Thus, current from the supply lines through the contactor 30 and the resistance 31 is supplied to the series field. If a failure of voltage occurs while the machine is drifting with the power applied the winding 29 is de-energized and the emergency switch E operates in the direction corresponding to the rotating of the shaft 2 and closes the dynamic braking circuit for stopping the motor. If the driven machine is operating in the forward direction and the operator should close the reverse contactor R to apply reverse power for stopping and failure of power should occur immediately afterward, the contactor R would drop open, and since the motor is still operating in the forward direction the emergency switch E would be operated counter clockwise to close the dynamic braking circuit for stopping the motor while running in the forward direction. It is seen therefore that the closing of the proper dynamic braking circuit depends upon the rotation of the shaft 2 driven by the motor regardless of what the operator may do in an attempt to control the motor from the master controller M.

Referring now to Fig. 4, the parts on the left hand half thereof are substantially like those on the left hand half of Fig. 1. The emergency switch E' differs from the emergency switch E in Fig. 1 by having two double-pole spring-closing contactors with separate operating windings therefor. The double-pole contactor 40 is closed by the spring 41 and held open by the winding 42 while the double-pole contactor 43 is closed by the spring 44 and held open by the winding 45. 46 is an interlock bar pivoted between its ends, either of which may be moved to prevent one of the contactors from closing and to permit the other to close. The bar 46 is operated in opposite directions by the windings 47 and 48 which are in series with the windings 42 and 45 and the contacts of the overload relay 49 having its windings 50 in series with the series field 3. The windings 47 and 48 are energized through current from the wire 10 to the center contact 51 and one of the contacts 52 and 53 of the clutch bearing switch C. This switch has a limited motion in either direction as determined by the stops 54 and 55. This switch is operated from the motor shaft 2 through the friction of the carbon brush 23 in a manner readily understood from Figs. 2 and 3. The contact face 56 of the switch C is arcuate and is long enough to connect the contact 51 to either of the contacts 52 and 53. It is also long enough to remain in contact with one of the outer contacts until it reaches the other. 57 and 58 are two switches and are opened by the respective contactors 40 and 43 when closed. These switches 57 and 58 are in series with the contacts of the overload relay 49 and the windings 5 and 6 of the contactors F and R.

With the switches 32 closed, current flows from the positive line 34 through the normally closed push-button 9, the contact 51, the switch C, the contact 53, the interlock winding 48, the contactor windings 42 and 45 and the contacts of the overload relay 49 to the negative line 35. Current in this circuit energizes the winding 48 to pull the interlock bar 46 or to hold the same in the position shown. At the same time current in the windings 42 and 45 opens the contactors 40 and 43 against the action of their springs 41 and 44. The opening of the contactors 40 and 43 causes the switches 57 and 58 to close whereby the power line 35 is connected to the windings 5 and 6. If the master switch M is now moved to the left into engagement with the contact 7 the winding 5 becomes energized and causes the contactor F to close whereupon the motor A rotates in the forward direction, for example. Assuming that the shaft 2 is rotating in a clockwise direction the switch C will be maintained in the position shown against the stop 55. The interlock bar 46 will also remain in the position shown.

If power fails while the machine is running in the forward direction, the contactor F will open and the windings 42, 45 and 48 will be de-energized. The interlock bar would not allow the contactor 40 to be closed by its spring 41, but the contactor 43 is closed by its spring 44 since the interlocking bar 46 is swung down out of the way. The contactor 43 upon closing completes a dynamic braking circuit from the left terminal of the armature 1, to the right hand member of the contactor 43, the series field 3, the dynamic braking resistance 59, and the left hand member of the contactor 43 to the right hand terminal of the motor armature. This dynamic braking circuit quickly brings the motor to rest. This action will also be obtained if the motor is operating in the forward direction whether the master switch M is moved to off-position or to the position attempting to close the contact 8 in an attempt to cause the armature to reverse its direction of rotation.

Upon restoration of power to the system the windings 42, 45, and 48 are again energized and the switches 57 and 58 are again closed. If the operator wishes to have the armature rotate in the reverse direction he moves the master switch M to the right into engagement with the contact 8 whereupon the winding 6 becomes energized and the contactor R closes. The control circuit through the winding 6 also includes the switches 57 and 58 and the contacts of the overload relay 49. The contactor R being closed, the motor operates in the reverse direction, turning the shaft 2 counter clockwise. Owing to the friction of the brush 23, the switch C is moved to the left against the stop 54. As soon as the contact surface 56 leaves the contact 53 the winding 48 is de-energized and when this surface reaches the contact 52 the winding 47 is energized in series with the windings 42 and 45. Current through the winding 47 turns the interlock bar 46 so that its right hand end will bar the closing movement of the contactor 43 and permit the closing movement of the contactor 40 when the windings 42 and 45 are de-energized. If power fails while the machine is running in the reverse direction the contactor R will drop open and the spring-closing contactor 40 will close a dynamic braking circuit from the right hand terminal of the armature 1 through the right hand member of the contactor 40, the series field 3, the braking resistance 59, and the left hand member of the contactor 40 to the left hand terminal of the motor armature. This circuit quickly stops the motor, it being impossible for the operator to interfere with the braking operation.

If the machine is drifting with no power applied to the motor the series field receives a small amount of current through the resistance 31 which keeps the series field 3 partially energized so that if power fails during the drifting period the dynamic circuit will be immediately set up upon the closure of the contactors 40 or 43 corresponding to the direction of rotation of the motor armature as determined by the position of the switch C.

In Fig. 5 a modification of the circuit through the interlock windings 47 and 48 is shown, in which a relay 60 has its winding 61 in series with the interlock circuit. The contacts of the relay connect the windings 42 and 45 to the source of supply. This permits the use of standard windings on the contactors 40 and 43. In case power goes off the relay 60 drops and opens the circuit of the windings 42 and 45 which allows one of the contactors 40 or 43 to be closed by its respective spring according to the position of the switch C as has been explained in connection with the description of Fig. 4.

Referring now to Figs. 6 and 7, the switch C of Fig. 4 is replaced by a zero speed switch having movable contacts 62 and 63. These switches are operated from the shaft 2 in the manner now to be explained. When the shaft 2 is at rest, the movable contacts 62 and 63 are closed against the stationary contacts 64 and 65 respectively. When the shaft turns in one direction the contact 62 engages the stationary contact 66 while the contact 63 remains in engagement with the stationary contact 65. When the shaft 2 turns in the opposite direction the contact 63 engages the contact 67 while the contact 62 remains in engagement with the contact 64.

With the connections as shown in Figs. 6 and 7 it will be seen that when the motor is at rest the windings 47 and 48 are connected in parallel and these parallel windings are connected in series with the windings 42 and 45. When the motor operates in the forward direction the contact 63 opens the circuit of the interlock winding 47 to be energized, tilting the interlock bar 46 shown in Fig. 4. When the motor is operating in the reverse direction the circuit of the winding 48 is de-energized by the opening of the contacts 62 and 64 and the winding 47 is maintained energized through the contacts 63 and 65. The operation of this system will be readily understood as it is substantially in accordance with the description of Fig. 4. By the use of the contacts 66 and 67 the operating winding 40' of the contactor 30 shown in Figs. 1 and 4 is arranged to be energized whenever the shaft 2 turns in either direction to close either one of the contacts 66 or 67. This arrangement provides for cutting out the teaser field circuit through the contactor 30 and the resistance 31 (Fig. 1) whenever the motor is at rest and energized whenever it is operating in either direction whether power is applied to the motor armature or not.

Referring now particularly to Fig. 7 but in connection with Fig. 6, the contact 62 is operated by the piston 68 which works in the cylinder 69. The oil pump 70 is connected to be driven from the shaft 2 by the belt 71, pressure being applied from the pump 70 to the cylinder 69 by the pipes 72 and 73. The contact 63 is operated in a similar manner by the plunger 74 in the cylinder 75 by means of the oil pump 76 which is connected to the cylinder 75 by the pipes 77 and 78. The pump 76 is driven from the shaft 2 by the belt 79.

The zero switch just described will be readily understood because such switches are well known. When the shaft 2 is operating in one direction it operates the pump 70 so as to cause the piston 68 to move the contact 62 away from the contact 64 and against the contact 66. At the same time the pump 76 is driven in such a direction as to allow its plunger 74 to remain down and the contact 63 to be in engagement with the contact 65. If the shaft 2 is rotated in the opposite direction the pump 76 will cause the plunger 74 to move the contact 63 from the contact 65 and into engagement with the contact 67. At the same time the plunger 70 will be operated to allow the piston 68 to be in its lower position so that the contact 62 engages the contact 64. It is thus seen that whenever either of the contacts 62 or 63 is in engagement with its lower contact, one or the other of the windings 47 and 48 will be energized and the windings 42 and 45 will at the same time be energized. The functions of the parts just mentioned will be readily understood from the description of the preceding figures. When the shaft 2 is not rotating both of the contacts 62 and 63 rest on their lower contacts. When either one of the contacts 62 and 63 is engaged with its upper contact the winding 40' is energized, causing the contactor 30 to close to connect the teaser circuit including the resistance 31 as already described in connection with Figs. 1 and 2.

A push-button switch 9 is shown in Figs. 1, 4, 5 and 6 so that the operator can at any time stop the motor by dynamic braking. When the switch 9 is open while the motor is running the winding 5 or 6 according to which is energized is de-energized and the windings 42 and 45 of the dynamic braking contactors are de-energized in order to bring the motor to a quick stop as described in case of a failure of power.

From the foregoing description it will be seen that I have provided a simple, effective dynamic braking arrangement for a standard form of series motors, for example, using only one main series field winding, (as distinguished from commutating windings), and that I have provided connections whereby the current from the line or dynamic braking circuit flows in the same direction through the series field winding. It is also apparent that by the inclusion of the variable resistance too abrupt a dynamic braking action in such a circuit arrangement is prevented. It will also be seen that by the use of either of the forms of reversing switch control, shown and described, that the connections through the armature and field to effect dynamic braking are changed, and the changing movement is physically initiated by the motor armature shaft whereby the proper current direction, that is, the proper reversing switch position, is made certain as a direct result of the rotation of the armature shaft at the time dynamic braking is effected. Also, this action is irrespective of the position of the manual control. The certainty of the dynamic braking may be further assured by the use of the teaser field circuit shown and described, and at a minimum of added expense.

Although this invention has been shown in connection with magnetically-operated forward and reverse contactors, it will be readily understood that it can be used equally as well with manually-operated forward and reverse contactors. It will also be obvious that the control of two motors may also be accomplished by the method disclosed, by suitably interconnecting the motors for power excitation and for braking as is readily apparent to those skilled in the art. Other modifications within the spirit of this invention can be made without departing materially from the appended claims.

I claim:—

1. In a control system for stopping an electric motor upon power failure, a source of power, a motor having an armature and a series field winding, a set of contacts operated by the forward rotation of the motor armature for connecting the armature and said series field in a circuit whereby the series field is energized by the counter-electro motive force of the armature to effect dynamic braking of the motor when the motor is running in the forward direction, a second set of contacts operated by the reverse rotation of the motor armature for connecting the armature and said series field in a circuit whereby the series field is energized by the counter-electro motive force of the armature to effect dynamic braking of the motor when the motor is running in the reverse direction, means preventing the closure of both sets of contacts when power is being supplied to the motor system, and means when power fails while the motor armature is rotating, for making the preventing means ineffective and thereby permitting the closure of the set of contacts corresponding to the direction of rotation of the armature.

2. In a system of control for stopping an electric motor upon power failure, a source of power, a motor having an armature and a series field winding, a set of contacts for connecting the armature and said series field in a circuit whereby the series field is energized by the counter-electro motive force of the armature to effect dynamic braking of the motor when the motor is running forward, a second set of contacts for connecting the armature and series field in a circuit whereby the series field is energized by the counter-electro motive force of the armature to effect dynamic braking of the motor when the motor is running in the reverse direction, means preventing the closure of both sets of contacts when power is being supplied, a pair of interlock magnets for selecting which set of contacts shall close, and means driven by the motor armature for controlling the interlock magnets so that the first set of contacts will close when power fails while the motor is running forward and the second set of contacts will close when power fails while the motor is running reverse.

3. In an electric motor control system, a source of power, a motor having an armature and a series field, directional switches having an off position and positions for connecting the armature in series with said series field in reverse order for operating the motor in the forward and reverse directions, a resistor, a contactor for establishing a dynamic braking circuit including the resistor and said series field while the motor is running in one direction, a second contactor for establishing a dynamic braking circuit including the resistor and said series field while the motor is running in the reverse direction, and means independent of the position of said directional switches and responsive to the direction of rotation of the motor armature for causing the first contactor to close when power fails while the motor is running in one direction and for causing the second contactor to close when power fails while the motor is running in the reverse direction.

4. In an electric motor control system, a source of power, a motor having an armature and a series field winding, directional switches having an off position and positions for connecting the armature in series with the field winding in reverse order for operating the motor in the forward and reverse directions, means for partially energizing the said series field when the motor armature is rotating while the directional switches are open, a contactor for establishing a dynamic braking circuit including said series field and a resistor for stopping the motor while the motor is running in one direction, a second contactor for establishing a dynamic braking circuit including said series field and a resistor for stopping the motor while the motor is running in the reverse direction, and means independent of the position of the directional switches and responsive to the direction of rotation of the motor armature for causing the first contactor to close when power fails while the motor is running in said first direction and for causing the second contactor to close when power fails while the motor is running in the reverse direction, the said means being operative at the time of power failure to close its respective dynamic braking circuit irrespective of whether there is power current in the motor armature or whether power is being applied to drive the motor forward or reverse.

5. In a control system for stopping an electric motor upon power failure, a source of power a resistor, a motor having armature and field windings, a dynamic braking circuit, a contactor for closing the circuit including the resistor the armature and field windings, a winding for holding said contactor open, contacts mechanically actuated by the rotational movement of the motor armature and a safety circuit connecting the last winding in series with said contacts to the source of power.

6. In a system of control for stopping an electric motor upon power failure, a source of power, a motor having armature and series field windings, a set of contacts for connecting the armature and series field in a dynamic braking circuit including resistance while the motor is running in one direction, a second set of contacts for connecting the armature and series field in a dynamic braking circuit including resistance while the motor is running in the reverse direction, windings for holding said sets of contacts open, means connecting said windings to the source of power, interlocking means for preventing the closure of both of the sets of contacts at a time, and means governed by the direction of rotation of the motor armature for operating the interlocking means so that when power fails while the motor is running in one direction the set of contacts which close to connect the dynamic braking circuit for the opposite direction is prevented from closing.

7. In a control system for electric motors, a source of power, a motor having an armature and a series field winding, means connecting the armature and series field winding to the source in series relation, means connecting the armature and series field winding to the source in series relation with the armature connections reversed, circuit closing means responsive to power failure while the motor is running forward for connecting the armature and said field in a closed circuit, a circuit closing means responsive to power failure while the motor is running reverse for connecting the armature and said field in a closed circuit with the armature connections reversed, and selective means mechanically governed by the direction of rotation of the motor armature for controlling the closure of the said circuit closing means.

8. In a motor control system, a source of power, a motor having an armature and a series field, a reverser magnetically-operated to close contacts to connect the armature and said series field to the source in reverse order for operating the motor in the forward and reverse directions, a switching mechanism having contacts adapted to connect the armature and said series field in reverse order in a closed dynamic braking circuit, magnetic means operated from the said source for holding the said switching mechanism in open contact position, and means mechanically governed by the direction of rotation of the motor armature for preventing the closure of certain contacts of said switching mechanism when power fails.

9. In a motor control system, a source of power, a motor having an armature and a series field, a reverser for connecting the armature in series with said series field to the source of power in reverse order for operating the motor in the forward and reverse directions, a set of spring closed contacts, magnetically opened by power from said source for connecting the armature and said series field in a closed circuit whereby the current is reversed in the armature and maintained in the same direction in the field with respect to the connection of the armature and said series field to the source for a corresponding rotation of the motor armature, a selector device for preventing the closure of certain of said contacts while the motor is running in the forward direction and preventing the closure of certain other of said contacts while the motor is running in the reverse direction, and contacts controlled by the direction of rotation of the motor armature for operating the selector device.

10. In a motor control system, a source of power, a motor having an armature and a series field, magnetically-closed switches for connecting the armature and said series field to the source in reverse order for operating the motor in the forward and reverse directions, magnetically opened switches for connecting the armature in series with the said series field in a closed circuit with the armature reversed with respect to the series field for a corresponding direction of rotation of the motor armature, means for preventing the closure of said magnetically closed switches when one of the magnetically opened switches is closed, means for preventing the closure of certain of magnetically opened switches when the motor is running in one direction, and means for preventing the closure of certain other of said magnetically opened switches when the motor is running in the opposite direction.

11. In a motor control system, a source of power, a motor having an armature and a single series field, a reverser operated to connect the armature and said series field to the source in reverse order for operating the motor in forward and reverse directions, a switching mechanism having contacts adapted to connect the armature and said series field in reverse order in a closed dynamic braking circuit, and means operating said switching mechanism in either direction depending upon the existing direction of rotation of the motor, said means including a set of contacts actuated by a rotatable arm associated with said armature and a teaser field winding to assure field excitation for dynamic braking action.

12. A safety motor control system, including a motor having an armature and a series field, a power supply line, controlling switches for operating the motor in opposite directions, reversing means between the armature and field, and means operating the reversing means in a given direction consequent upon the direction of rotation of the motor whereby dynamic braking may be effected upon failure of the power in the line, said means being actuated by mechanical connection with a rotating part of the motor.

13. In a system of the character described, the combination of a motor having a series field, a power line, controlling mechanism for causing operation of the motor in either direction, a reversing switch and connections between the field and armature, means responsive to rotation of the armature normally urging said switch to close, and means normally holding said switch in inactive position and responsive to power in the line, whereby upon the power line failure the switch mechanism becomes operative to close connections between the field and armature in reverse order, effecting dynamic braking.

14. The combination of a motor having an armature and a main series field, a power line and operating connections arranged to be held closed by power in the line, a dynamic braking means including a reversing switch connected between the armature and field, means for operating the reversing switch by the rotation of the armature, and means holding the switch in idle position dependent upon power in the line.

15. The combination of a motor having an armature and main series field, a power line connected therewith, a dynamic braking means connected to the field and armature including a reversing switch, means holding the switch normally idle by power from the line, and means actuated by the motion of the motor for initiating operation of the reversing switch upon power line failure.

16. The combination with a motor having a series field, of a safety motor controlling means, including power line connections to the motor held closed by line power, and a dynamic braking means including a reversing switch connected between the armature and field, means holding the switch normally idle and dependent upon power in the line, means actuated by movement of the motor itself for closing the switch in one or the other of its two positions.

17. In a control system for stopping an electric motor upon power failure, a source of power, a motor having an armature and a series field winding, a plurality of dynamic braking circuits, contactors for closing an effective dynamic braking circuit including said series field for either direction of rotation of the motor armature, means responsive to the power supply for holding said contactors open, and means mechanically governed by the direction of rotation of the motor armature for closing one of said contactors and preventing closure of another when power fails.

18. In a motor control system the combination with a source of current supply, a motor having an armature and a series field winding, directional switches for connecting the said source to the armature in series with the field winding in reverse order to effect forward and reverse rotation of the armature, dynamic braking circuits, switches for effectively connecting one of said dynamic braking circuits to said armature and field winding upon failure of power, means for applying reverse current to the motor while rotating in a forward direction, whereby said motor rotation in the forward direction is arrested and said braking switches are unaffected by the application of said reverse current.

19. The combination of a source of current supply, a motor having an armature and a series field winding, a switch having two contacts, means whereby the forward rotation of the motor closes one contact, means whereby the reverse rotation of the motor closes the other contact, a plurality of dynamic braking circuits, one only of which is closable by one of said contacts on failure of power, each of said circuits including the said armature and said series field winding.

20. The combination of a source, a motor having an armature and a series field winding, a switch having two contacts, means whereby the forward rotation of the motor closes one contact, means whereby the reverse rotation of the motor closes the other contact, a plurality of dynamic braking circuits, one only of which is closable on failure of power, each of said circuits including the said armature and said series field winding, and means controlled by said contacts for selecting which of said dynamic braking circuits will become effective at the time of power failure.

21. In a motor control system, a source, a motor having an armature and series field, means for reversing said motor, a pair of magnetically opened spring closed switches, means for holding said switches opened when power is applied to said motor, a plurality of dynamic braking circuits, one of which is effective for stopping the motor at the instant of power failure, each circuit including said armature and said series field winding and the contacts of one of said switches, and means governed by the direction of rotation of said armature for selecting which of said switches shall close upon the failure of power.

22. In a motor control system, a source, a motor with armature and series field, a pair of dynamic braking circuits, each including said armature and series field and effective with respect to the direction of rotation of the said armature, a pair of power opened mechanically closed switches each having contacts in one of said dynamic braking circuits, means governed by the direction of rotation of the said armature for preventing the closure of one of said switches and permitting the closure of the other switch upon power failure, said means including a selective device to permit the switch to close which will make effective the dynamic braking circuit corresponding to the direction of rotation of the motor armature at the time of power failure.

23. In a motor control system, a source of supply, a motor having an armature and a series field winding, a plurality of magnetically-closed switches for connecting the motor to the source of supply for forward and reverse operation of the motor, a plurality of dynamic braking circuits, a plurality of normally closed switches in said braking circuits, means for opening said latter switches when power is applied to the motor, and means for preventing the closure of certain of said latter switches when power fails.

24. In a motor control system, a source of supply, a motor having an armature and a series field winding, a plurality of magnetically closed switches for connecting the motor to the source of supply for forward and reverse operation of the motor, braking circuits, a plurality of magnetically opened switches for closing said braking circuits, means for opening said latter switches when power is applied to the motor, and means governed by the direction of rotation of the motor armature for preventing the closure of certain of said latter switches when power fails.

25. In a motor control system the combination of a source of supply, a motor having an armature and a series field winding, directional switches for connecting the said source to the armature and series field winding to effect forward and reverse rotation of the armature, a plurality of braking switches, magnetic means for holding said braking switches open when power is available to operate said motor, means responsive to closure of said switches for circulating dynamic braking currents through said armature and field windings, means for applying reverse current to said motor while the motor is rotating in a given direction, and means whereby said braking switches are unaffected by application of said reverse current to the motor.

26. The combination of a source of current supply, a motor having an armature winding and a series field winding, directional switches for operating the motor in forward and reverse directions, a plurality of dynamic braking circuits, a plurality of switches in said dynamic braking circuits, magnetic means holding said last mentioned switches open as long as power is available for operation of said motor, means for applying reverse current to the motor when the motor is rotating in one direction, and means whereby said braking switches are unaffected by application of said reverse current in connecting said braking circuits to said armature and field windings.

27. In a motor control system, the combination of a source of supply, a motor having an armature winding and a series field winding, directional switches for connecting the said source to the armature and the series field windings to effect forward and reverse rotation of the armature, a plurality of dynamic braking circuits, a plurality of switch contacts in said dynamic braking circuits, magnetic means holding said switch contacts open as long as power is available to operate said motor, means for applying reverse current to the motor while the motor is rotating in a given direction to slow down the motor, and means responsive to a failure of said source of supply for causing said switch contacts to close said dynamic braking circuits whereby dynamic braking currents are circulated thru said armature and field windings to effect a further slowdown of the motor while rotating in the said given direction.

28. In a system for the control of the series type of motors having armature and series field windings and adapted to drive a load, the system including a motor having armature and series field windings, a source of supply, directional switches for connecting the said source to the armature and series field windings to effect forward and reverse rotation of the armature, a plurality of braking circuits, a plurality of switch contacts in said braking circuits, electro-responsive means holding said switch contacts open as long as power is available to operate said motor, means for applying reverse current to the motor while the motor is rotating in a given direction to slow down the motor, and means responsive to a failure of said source of supply for causing said switch contacts to close braking circuits whereby currents generated as a result of continued movement of the load subsequent to the failure of said source are circulated through said armature and series field windings to effect a further slowdown of the motor while rotating in the said given direction.

DAVID C. WRIGHT.